3,208,843
GRANULAR HERBICIDAL COMPOSITION AND PREPARATION THEREOF

Durward O. Guth, 7828 Sunset Ave., Elmwood Park, Ill.
No Drawing. Filed Mar. 1, 1962, Ser. No. 176,810
4 Claims. (Cl. 71—2.6)

This invention relates to a dry, free-flowing herbicidal composition consisting of a quick dissolving water soluble lithium salt of 2,4-dichlorophenoxyacetate and to methods for the preparation of this novel composition.

2,4-dichlorophenoxyacetic acid is widely used as a chemical herbicide on the basis of its selective contact action as a plant hormone being translocated after penetrating the leaf cells and moving in the vascular tissues of the plant to kill meristematic regions of the roots. Selectivity is believed to be due to differences in enzyme systems in weeds and crops, the 2,4-D molecule being toxic to many broad-leafed plants and relatively non-toxic to a host of crops of the grass family.

Although substantial evidence has been collected to observe the retention or concentration of 2,4-D in living plant cells at the cuticle, mesophyll and roots, there is as yet no clear understanding of the selective herbicidal action of 2,4-D which acts in different ways at different stages of the plant's growing cycle.

The important contribution made by the present invention lies in improving the control with which the 2,4-D hormone may be applied, in critical dosage, for the desired and herbicidal result. Even in instances where 2,4-D is used as a non-selective soil treating agent for control of deep rooted perennial weeds, dosages must be controlled accurately to obtain reproducible results and intended results as will permit the growth of the desired non-weed crop.

Initial efforts have been in the direction of utilizing the effective organic molecule in the form of the free acid in weed killing concentrations of at least 0.04% by weight of free 2,4-D acid in an aqueous dispersion containing a wetting agent, preferably a non-ionic alkali stable wetting agent such as described in Jones Patent No. 2,396,513.

The inability to control, within precise limits, the level of 2,4-D free acid in dispersions has led to commercial mixtures embodying the lower aliphatic esters of the free acid. The esters of the free acid have the advantage that greater amounts may be dissolved in the aqueous carrier provided that a volatile water-miscible organic solvent is employed to enhance solution of the relatively insoluble 2,4-D free acid.

Recent field experience with 2,4-D ester formulations has disclosed that the 2,4-D ester exhibits substantial volatility which causes the applied level to fall below the desired concentration as a result of evaporation of the ester under the temperature extremes normally encountered in field applications.

Due to the need for better control of the 2,4-D level and for better stability in long-term applications to crops and weeds efforts have been made to use the non-volatile salts, preferably the cheaper salts such as sodium or potassium salts of 2,4-D acid. The requirements in the field, is that the salt dissolved instantaneously, e.g., in less than one minute, in whatever water is available at the agricultural site, whether it be hard water, salty water, relatively cold or warm.

The sodium salt has not been successfully applied due to its limited solubility in water. The farmer prepares his sprayer by dissolving one pound of the salt in 10 gallons of water and does not, as a matter of practice, mix more than a few minutes before he loads the solution into the sprayer, and dilutes with available water in accordance with recommendations from the U.S. Department of Agriculture. Solubility of the sodium salt in distilled water at 20° C. is only 4 grams in 100 milliliters of water. The fact that heating the water to 100° C. brings the solubility up to 62 grams per 100 milliliters is of no practical significance, indeed it is a detriment because the heating step is followed by crystallization on cooling, the crystals being slowly dissolving in diluting water and the crystals tending to plug up the spraying orifices of the apparatus. If this unsatisfactory application is repeated, the kill will become complete for the weed as well as for the crop and the crop is sacrificed. In areas of heavy rainfall the application of this agent requires a different kind of attention to the concentration than in dry areas, and only by more precise control of the active agent can all of the remarkable characteristics of the hormone be successfully realized with precision and reproducibility in the hands of a farmer who is not ordinarily a skilled chemist and a plant physiologist.

The dry, free-flowing lithium salt of 2,4-dichlorophenoxyacetate in accordance with the invention in the hands of the farmer, dissolves in water substantially instantaneously if the lithium salt is prepared in accordance with the invention to contain at least 10% of the salt in the form of hydrated crystals of the lithium salt to overcome the problem of clumping which is a characteristic of the anhydrous lithium salt.

Anhydrous lithium 2,4-D salt when added to cold water forms a skin of hydrated lithium salt and this skin causes clumps of solid material to agglomerate with the dry salt material on the inside of the clump. Despite vigorous stirring, freshly exposed dry salt material which is obtained in smaller particles by breaking the clumps, forms a similar skin as the larger particles and the same type of delays in dissolving is encountered as with the larger particles.

Following is a detailed description of the properties of the anhydrous and hydrated forms of lithium 2,4-dichlorophenoxyacetate and of other alkali metal salts which for convenience are written as Na:2,4-D to define the anhydrous salt of the sodium species, for example, and which have following the salt designation the number of mols of water of crystallization by the integer preceding $H_2O$.

In the case of the lithium salts of the invention, the anhydrous salt is identified as (zero $H_2O$) to more clearly separate it from the hydrated forms in the description which follows.

Lithium 2,4-dichlorophenoxyacetate exists in several different hydrated forms besides the anhydrous, Li:2,4-D (zero $H_2O$) form, e.g., Li:2,4-D $2H_2O$ or 2Li:2,4-D $3H_2O$ in the form of needle crystals, and Li:2-4 $3H_2O$ in the form of cubes or short rectangular bars.

The needle crystals are hereinafter termed the dehydrate and are formed out of water solutions at temperatures above 35° C. while the cube crystals, the trihydrate, are formed out of water solutions at temperature below 20° C.

The empirical formulae assigned to the different hydrated forms of Li:2,4-D are the result of many $H_2O$ determinations, the average of which are not precisely those of any simple chemical formula. The composite $H_2O$ average for the hydrated needle crystals is 11.5% as water of hydration and the closest simple empirical formula is either Li:2,4-D $2H_2O$ (13.7% $H_2O$) or 2Li:2,4-D $3H_2O$ (10.64% $H_2O$). The composite $H_2O$ average for the cube crystals is 18.5% and the closest simple empirical formula is Li:2,4-D $3H_2O$ (19.24% $H_2O$). For simplicity, the needle composition is referred to as 2Li:2,4-D $3H_2O$ and the cube composition is referred to as Li:2,4-D $3H_2O$.

Removal of part of the $H_2O$ from cube crystals by careful heating will give a product having the original cube appearance yet possessing the identical composition of the needle crystals, i.e., 2Li:2,4-D 3H$_2$O.

All of the H$_2$O can be removed from either 2Li:2,4-D 3H$_2$O or Li:2,4-D 3H$_2$O to give Li:2,4-D (zero H$_2$O). This takes place rapidly at temperatures above 60° C. The final Li:2,4-D (zero H$_2$O) has a melting point of 221° C.

Thus the 2Li:2,4-D 3H$_2$O composition appears to be a highly stable form, as drying of cube crystals at room temperature and at relative humidities between 30% and 70% results in H$_2$O contents of the order of about 10.64% H$_2$O while the trihydrate needles are less stable.

Accurate determinations of the melting points of either 2Li:2,4-D 3H$_2$O or Li:2,4-D 3H$_2$O is not possible because of the instability of these products in the isolated condition and at elevated temperature. Quick elevation of the temperature to 100° C. appears to melt the cube (Li:2,4-D 3H$_2$O) crystals. However, slower heating, as is normal for melting point determinations, always results in the 221° C. melting point of the Li:2,4-D (zero H$_2$O) material.

Anhydrous Li:2,4-D (zero H$_2$O) appears to have a higher energy level than the hydrated material and this characteristic appears to be responsible in part for the difficulty in dissolving Li:2,4-D (zero H$_2$O). When anhydrous Li:2,4-D (zero H$_2$O) is added to water there is a rapid change to the lower energy level Li:2,4-D 3H$_2$O, which form of Li:2,4-D is difficult to dissolve. Clumps of Li:2,4-D (zero H$_2$O) can form a skin of Li:2,4-D 3H$_2$O that is slow to dissolve and that retards the dissolving of the entire clump or agglomerate by keeping it intact and preventing its breaking up in water.

Whereas Li:2,4-D (zero H$_2$O) does not cake during storage but is difficult to dissolve, 2Li:2,4-D 3H$_2$O dissolves easily and quickly but gives trouble from caking in storage. The third commn form, i.e., Li:2,4-D 3H$_2$O, has poor dissolving characteristics and also cakes badly.

In a preferred method of manufacture, the hydrate salts are prepared by reacting at elevated temperatures equimolar amounts of substantially pure, finely divided 2,4-D acid with a finely divided lithium base selected from the group consisting of anhydrous lithium hydroxide (solid at room temperature), lithium hydroxide monohydrate (solid at room temperature), and lithium carbonate in the presence of an amount of water as will provide preferably less than 25% of water including water of hydration and reaction from the reagents whereby further dehydration is unnecessary and to produce an instant dissolving free-flowing product.

The method of the invention is, of course, not limited to the addition of just sufficient water to provide the hydrate crystals of lithium salt at a level of about 1.8%–10.2% H$_2$O in the final product by the single reacting step followed by granulation. Under circumstances where technical 2,4-D acid is purified in the presence of a large amount of water, the lithium base addition can be made in which the water content may be as high as 50–60% in the final solution to permit crystallizing and filtering operations. This latter alternate process requires a heating step such as in a drum dryer or tunnel dryer which involves certain difficulties overcome by blending and grinding the hydrated and anhydrous forms of lithium salt in accordance with the preferred ratios of Formula 1.

Conventional drying methods such as are suitable for drying Na:2,4-D H$_2$O filter cake or for converting Na:2,4-D H$_2$O to Na:2,4-D (zero H$_2$O) are not suitable for removing H$_2$O from the hydrated forms of Li:2,4-D because of the pronounced caking tendency of the Li:2,4-D hydrates. An attempt to remove H$_2$O from Li:2,4-D hydrates in conventional tunnel dryers or hearth dryers results in such a build up of tenacious cake that the equipment must be stopped and the cake chipped off. Baking of the cake in an oven results in the formation of hard cakes that dry slowly. Where the oven temperature is above 65° C. and particularly if it is around 90° C., the surface may melt (dissolve in the water in the brine remaining in the filter cake) and form a continuous film that bridges across the mass and effectively prevents further drying.

It is the curious caking characteristic of the anhydrous lithium 2,4-D salt which is unexpectedly overcome by mixing with the hydrated forms that is surprising which thus represents the unexpected feature of the present composition.

It is an objective for the manufacturer to provide the farmer with a cheap, convenient, non-volatile, non-corrosive product which will not decompose or change in strength from temperature extremes and which will retain all of the toxic properties of the parent-free acid.

Surprisingly, an all hydrate salt of lithium 2,4-D need not be used to get instantaneous dissolving action as will be seen from the following Table I which compares the rates of solution of anhydrous and hydrated forms of lithium salt as well as the conventional sodium forms.

All tests were made by dissolving dry-free flowing salt to the equivalence of 1 pound of 2,4-D acid in 10 gallons of water at 20° C. The samples were ground and graded to "all through 30 mesh, 40% through 100 mesh." Stirring was uniform and gentle.

TABLE I

| Compound: | Time for complete solution |
|---|---|
| Na:2,4-D | minutes__ 20 |
| Na:2,4-D H$_2$O | do____ 20 |
| Li:2,4-D | do____ 4 |
| Li:2,4-D 3H$_2$O | do____ 2 |
| 2Li:2,4-D 3H$_2$O | seconds__ 25 |
| 50% Li:2,4-D–50% 2Li:2,4-D 3H$_2$O | ___do____ 30 |

The product of the invention in the 50/50 blend above referred to in Table I dissolves very easily and rapidly, yet does not cake in storage as does 2Li:2,4-D 3H$_2$O.

Not only does the Li:2,4-D hydrated composition of the invention dissolve more rapidly than Na:2,4-D compositions, but it is more than 10 times as soluble as Na:2,4-D.

Table II below compares the solubilities of various alkali metal salts of 2,4-D.

TABLE II

| Salt | Solubility Expressed in Grams of 2,4-D Acid Equivalent in 100 ml. of Water | |
|---|---|---|
|  | At 20° C. | At 100° C. |
| Li:2,4-D | 49 | 205 |
| Na:2,4-D | 4 | 62 |
| K:2,4-D | 32 | 137 |
| Rb:2,4-D | 39 | 188 |
| Cs:2,4-D | 150 | 346 |

In a preferred embodiment of the invention which is designated as Formula 1, the two ingredients shown in the table below are thoroughly mixed, preferably in the form of a fine powder having the size specifications of "all through 30 mesh and 40% through 100 mesh".

| Ingredients | Maximum, pounds | Minimum, pounds | Optimum, pounds |
|---|---|---|---|
| 2Li:2,4-D 3H$_2$O | 90 | 20 | 50 |
| Li:2,4-D (Zero H$_2$O) | 80 | 10 | 50 |

The resulting product dissolves with great rapidity and at the same time is resistant to caking in storage. The total H$_2$O content is between 1.8% and 10.2% with the optimum H$_2$O content at 5.5%.

The invention is further illustrated by reference to the following examples in addition to the examples given above. Parts are parts by weight.

Example 1

The following materials are added to a ribbon blender provided with a jacket for heating and cooling the contents:

| | Pounds |
|---|---|
| 99% 2,4-dichlorophenoxyacetatic acid | 61.35 |
| Lithium hydroxide monohydrate | 11.58 |
| $H_2O$ | 12.50 |

These ingredients are mixed at a temperature of 95° C. to 102° C. until they are all reacted and the solution is complete. At this point the total $H_2O$ content is 25% and the pH may conveniently be 9. If desired additional acid or additional hydroxide may be added to obtain the desired pH.

Then warm dry air is introduced which both cools the solution and reduces the $H_2O$ content. As this takes place, a profuse formation of needle crystals result, which makes the mixture thick and pulpy. Mixing and drying is continued to remove $H_2O$. Care must be exercised not to apply heat to the jacket at an excessive rate, as this causes a tenacious cake to form on the jacket that prevents good heat transfer into the mixture and that may actually bind the ribbon and stall the mixer. It is preferable to reduce the temperature to 35° C. to 45° C. until the $H_2O$ content has been brought down to the range of 2Li:2,4-D 3$H_2O$ (i.e., 10.64% $H_2O$).

As this $H_2O$ content is reached, it is convenient to apply heat to the mixer jacket and raise the temperature to 60° C. or higher to expedite the final $H_2O$ removal. The process may be stopped when the $H_2O$ content is anywhere between 10.2% and 1.8% and the product, when ground and graded to the same mesh size, has comparable fast dissolving and resistance to caking characteristics of Formula 1 material.

The yield obtained is 67.5 pounds of product corresponding to the composition 33.75 pounds of Li:2,4-D (zero $H_2O$) and 33.75 pounds of 2Li:2,4-D 3$H_2O$ and having 5.5% total $H_2O$.

Example 2

In Example 1 lithium hydroxide monohydrate was used as this is the easiest $Li_2O$ source to use. There are instances, however, when lithium carbonate is a cheaper source of $Li_2O$. It does, however, introduce process problems and the following example describes how lithium carbonate may be used advantageously as a source of $Li_2O$.

The following ingredients are placed into a jacketed ribbon blender:

| | Pounds |
|---|---|
| 99% 2,4-dichlorophenoxy acetic acid | 61.35 |
| Lithium carbonate | 7.75 |

Thoroughly mix these ingredients dry and then introduce live steam to heat the mixtures, to provide water for the reaction and to prevent the formation of excessive foam. It is desirable to keep the mixture only slightly moist during the active portion of the reaction so that the mass is mealy and allows the $CO_2$ to escape without excessive foaming. The use of live steam for heating, rather than heating through the jacket, eliminates objectionable tenacious hydrated salt cake from forming on the jacket.

The most efficient utilization of lithium carbonate as a source of $Li_2O$ requires that its use be discontinued as the pH approaches 5.6 to 7 since the final stage of neutralization at this pH of 507 $CO_2$ is not evolved rapidly, and lithium hydroxide monohydrate is used to complete neutralization at 90 to 105° C. Up to this point the reaction requires considerable addition of heat.

There is added at 90° C. 2.80 pounds lithium hydroxide monohydrate with continued mixing. The reaction is strongly exothermic and the temperature climbs to 102 to 104° C. After cooling and graining the free-flowing salt is sieved and is ready for use.

Example 3

Examples 1 and 2 have the advantage of completing the $H_2O$ removal in the same piece of process equipment that is used for reacting the acid and base. One is not limited, however, to this method for drying. One may take the product from the ribbon mixer at the stage where it contains about 25% total $H_2O$ and apply a layer of this product to an internally heated slowly rotating drum. A layer .007 of an inch thick is desirable for this operation. The speed of rotation, drum temperature, and access to drying air are adjusted and coordinated so that the $H_2O$ content at the location where a scraper or doctor blade is provided to scrape off the adhering dried cake.

From this point on, excess and unwanted $H_2O$ may be eliminated while still in the ribbon blender by the same procedure as used in Example 1. The final product has the same fast dissolving and resistance to caking characteristics as Formula 1 material or Example 1 material. The yield is equal to that of Example 1.

Example 4

In instances where the raw materials are relatively impure, the total $H_2O$ content of the final solution may be adjusted to greater than 25%. 50% total $H_2O$ is satisfactory. The solution is then chilled to produce either needle or cube crystals and these crystals are removed from the solution by conventional filtration or centrifuge methods. When necessary to eliminate excessive impurities, this crystallization and filtration operation may be repeated. The unwanted $H_2O$ in the filter cake may be removed by charging the filter cake into a ribbon mixer and proceeding as in Example 1. As an alternative, sufficient water may be added to render the filter cake fluid at the temperature of the drum surface, and then one may proceed to remove $H_2O$ as in Example 3.

If and when the $H_2O$ content is outside the desired range, high and low $H_2O$ content products may be mixed in a second ribbon mixer that need not have a heating jacket and that may be operated at room temperature. The relative proportions of high and low $H_2O$ content products may be varied so that the final product will have the desired $H_2O$ content and within the percentage limits of the present invention. The final product is then ground and graded as in Example 1 and it performs in equivalent fashion to the product of Formula 1 and of Example 1.

The large acreage farmer cannot readily apply the 2,4-D free acid which is substantially insoluble in water unless he resorts to the purchased dispersion and he, of course, objects to paying for the shipment of water and the higher cost. The farmer has a real problem with foliar application since the lethal dose in the form of free acid is about 2 pounds per acre, the translocation dose recommended for killing perennial weeds is between 1 and 2 pounds per acre and persistence on the leaf as well as in the ground depends upon rainfall which is unpredictable.

The solubility of the sodium salt expressed as equivalent 2,4-D acid is 4 grams per 100 ml. of water at 20° C. and this solubility is obviously not suitable for the pre-emergent broad-leaf weed killer dosage applied by the farmer at 2 to 10 pounds per acre of 2,4-D acid equivalent in about 10 gallons of water.

The foliar application of sodium salt of 2,4-D is generally agreed to give better weed killing results by using more than one application at levels precisely controlled to total 1 to 2 pounds of the 2,4-D acid per acre.

The 2,4-D ester is capable of releasing highly toxic vapors and is therefore dangerous to use in the vicinity of desirable crops which inherently suffer injury from foliar application. Tomatoes, grapes, squash, cucumbers, and cotton are also damaged.

It is the lithium salt in hydrated form in the composition of the invention which provides an outstandingly useful unit dosage of 2,4-D to eliminate the problems met with the ester and to meet the requirements of economy, convenience by instant dissolving and precisely controlled dosage for foliar or pre-emergent application. In dosage unit one pound packages, only ½ to 2 packages are required for post-emergent dosage per acre, the one-pound contents dissolving instantly in one gallon of water or 10 gallons of water for use in available spraying equipment. Less than lethal dosages for intermittent growth stimulation of desirable crops are had with one package per 40 gallons of farm or creek water in the conventional sprayer. If water softeners are needed they can be added. For example, one may use 1½% tetra-lithium ethylenediaminetetra-acetate to the ingredients of Example 1, this softening agent will be distributed uniformly in the final dry, free-flowing product.

It will be seen from the foregoing examples that the method of the invention comprises the preparation of the dry free flowing hydrated water soluble forms of lithium salt either directly as the product of reaction and mixing in a single vessel or by carrying out the method in a reactor vessel and a mixing vessel. To produce the product in free flowing form within proportions by weight of hydrated salt to non-hydrated salt varying on a weight basis from a ratio of 9:1 to 2:8.

Temperature of reaction of the neutralization step can be up to about 105° C. at the boiling point of the lithium carbonate neutralized 2,4-D acid mixture containing less than 25% H$_2$O.

The product is useful in unit dosage form in packages containing 1 pound of 2,4-D acid equivalent which at about 5.5% water hydration for the composition corresponds to 1.1 pounds of the free flowing instant soluble granulated product of the invention, this product useful to be mixed with from 1 to 10 gallons of water to give adequate herbicidal treatment for one acre, multiple units of the package up to 10 providing all of the dosages for growth stimulation, and for pre-emergent and post-emergent weed killing.

The product of the invention is substantially non-caking in storage under bearing relative humidity conditions encountered from one year to the next.

Having thus disclosed the invention, I claim:

1. A method of preparing a granular herbicidal composition of dry, free-flowing, cold water-soluble lithium salt of 2,4-dichlorophenoxyacetic acid from equimolar reacting amounts of lithium base and 2,4 - dichlorophenoxyacetic acid comprising reacting at about 70° C. to about 100° C. while stirring the amount of substantially pure, finely divided, 2,4-dichlorophenoxyacetic acid with the equimolar amount of finely divided, solid lithium base selected from the group consisting of anhydrous lithium hydroxide, lithium hydroxide monohydrate and lithium carbonate in the presence of an amount of water as will after drying and granulating provide less than 25% but more than 1.8% of water including water of reaction and water of hydration derived from said lithium base to form a mixture of hydrated and non-hydrated lithium salt of 2,4-dichlorophenoxyacetic acid, continuing said heating to reduce the water content to less than 10.2% of water, cooling to room temperature, and granulating said salt to finely divided particle size to obtain as a result of the controlled reaction in the presence of said predetermined quantities of water a non-caking, storage-stable, free-flowing dry partly hydrated product containing from 1.8% to 10.2% by weight of water of hydration and no other water, said product when sieved through a 30 mesh screen onto a 100 mesh screen dissolving completely in water at 20-25° C. at an amount of one pound of dry product per 10 gallons of water within 1 minute.

2. A method as claimed in claim 1 wherein said lithium base is added in two stages, there being added in the first stage an amount of lithium carbonate in the presence of live steam to bring the pH of the reaction mixture to a value of about 5.6 to 7 at a temperature of about 70° C. to about 105° C. until evolution of carbon dioxide has ceased and lithium hydroxide monohydrate is added in the second stage at a temperature of 95–105° C. to complete the neutralization.

3. A method as claimed in claim 2 wherein the amount of water is added to give a final content of water in the salt of about 5.5%.

4. The granular, free-flowing, dry herbicidal product consisting of water-soluble lithium salt of 2,4-dichlorophenoxyacetic acid formed by reacting equimolar amounts of lithium base and 2,4-dichlorophenoxyacetic acid at about 70° C. to about 100° C. while stirring the finely divided, solid lithium base selected from the group consisting of anhydrous lithium hydroxide, lithium hydroxide monohydrate and lithium carbonate in the presence of monohydrate and lithium carbonate in the presence of an amount of water as will, after drying and granulating, provide less than 25% but more than 1.8% of water including water of reaction and water of hydration from said lithium base, the resulting mixture of hydrated and non-hydrated lithium salt being heated to reduce the water content to less than 10.2% and then granulated to produce a product containing from 1.8% to 10.2% by weight of water of hydration and no other water, said product when sieved through a 30 mesh screen onto a 100 mesh screen dissolving completely in water at 20°–25° C. at an amount of one pound of dry product per 10 gallons of water within 1 minute.

References Cited by the Examiner

UNITED STATES PATENTS

| 2,390,941 | 12/45 | Jones | 71—2.6 |
| 2,394,916 | 2/46 | Jones | 71—2.6 |
| 2,709,648 | 5/55 | Knight | 71—2.2 |
| 2,904,423 | 9/59 | Stone et al. | 71—2.4 |
| 3,023,096 | 2/62 | Guth | 71—2.6 |

LEWIS GOTTS, *Primary Examiner.*